(12) United States Patent
Hori et al.

(10) Patent No.: US 10,629,920 B2
(45) Date of Patent: Apr. 21, 2020

(54) VALVE UNIT

(71) Applicants: SOKEN, INC., Nishio-shi, Aichi (JP); TOYOTA JIDOSHA KABUSHIKI KAISHA, Toyota-shi, Aichi (JP)

(72) Inventors: Ryosuke Hori, Nishio (JP); Hiroki Yahashi, Toyota (JP); Koji Kida, Toyota (JP)

(73) Assignees: SOKEN, INC., Nishio-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 37 days.

(21) Appl. No.: 15/891,966

(22) Filed: Feb. 8, 2018

(65) Prior Publication Data

US 2018/0241052 A1    Aug. 23, 2018

(30) Foreign Application Priority Data

Feb. 20, 2017    (JP) .................................. 2017-029381

(51) Int. Cl.
| | |
|---|---|
| *H01M 8/0258* | (2016.01) |
| *H01M 8/04119* | (2016.01) |
| *H01M 8/04089* | (2016.01) |
| *H01M 8/04082* | (2016.01) |

(Continued)

(52) U.S. Cl.
CPC .......... *H01M 8/0258* (2013.01); *F15D 1/025* (2013.01); *F15D 1/04* (2013.01); *F15D 1/14* (2013.01); *F16K 15/185* (2013.01); *F16K 27/029* (2013.01); *F17C 13/04* (2013.01); *H01M 8/04089* (2013.01); *H01M 8/04179* (2013.01);

(Continued)

(58) Field of Classification Search
CPC ... F15D 1/025; F15D 1/04; F15D 1/06; F15D 1/12; F15D 1/14; H01M 8/0258; H01M 8/026; H01M 8/0263; H01M 8/0265; H01M 8/04089; H01M 8/04201; F16K 27/029;

(Continued)

(56) References Cited

U.S. PATENT DOCUMENTS

| | | | | |
|---|---|---|---|---|
| 4,469,446 | A | * | 9/1984 | Goodboy ................. F23J 15/02 137/896 |
| 4,824,614 | A | * | 4/1989 | Jones .................... B01F 5/0617 137/561 A |

(Continued)

FOREIGN PATENT DOCUMENTS

| | | |
|---|---|---|
| JP | 2015021608 A | 2/2015 |
| JP | 2016080001 A | 5/2016 |

*Primary Examiner* — Seth W. Mackay-Smith
(74) *Attorney, Agent, or Firm* — Dickinson Wright PLLC (57) ABSTRACT

Provided is a valve unit including a first gas flow channel to a gas tank and a second gas flow channel branching off from the first gas flow channel and leading to a gas-consuming device. The valve unit can avoid the entrance of water, which may be included in gas, into the second gas flow channel. The first gas flow channel to let gas from the outside in has a bend. The first gas flow channel has a communication port to the gas tank at an end downstream of the bend. A second gas flow channel branches off at a branching part between the bend and the communication port, and the second gas flow channel leads to the gas-consuming device. A straightening member is disposed between the bend and the branching part, and is to straighten the gas flow from the upstream to be parallel to the direction of the first gas flow channel.

6 Claims, 7 Drawing Sheets

(51) Int. Cl.
| | |
|---|---|
| (2006.01) | *F17C 13/04* |
| (2006.01) | *F15D 1/02* |
| (2006.01) | *F15D 1/04* |
| (2006.01) | *F15D 1/06* |
| (2006.01) | *F15D 1/12* |
| (2006.01) | *F15D 1/14* |
| (2006.01) | *F16K 27/02* |
| (2006.01) | *F16K 15/18* |
| (2006.01) | *H01M 8/0438* |
| (2016.01) | |

(52) U.S. Cl.
CPC ... *H01M 8/04201* (2013.01); *H01M 8/04432* (2013.01); *F17C 2205/0385* (2013.01); *H01M 2250/20* (2013.01); *Y02T 90/32* (2013.01)

(58) Field of Classification Search
CPC .............. F17C 13/04; F17C 2205/0385; F17C 2205/0382
USPC ...................................................... 138/37, 39
See application file for complete search history.

(56) References Cited

U.S. PATENT DOCUMENTS

| | | | | |
|---|---|---|---|---|
| 6,691,729 | B2 * | 2/2004 | Takeda | F16K 1/305 |
| | | | | 137/601.14 |
| 6,708,727 | B2 * | 3/2004 | Shiraishi | F16L 55/02718 |
| | | | | 137/561 A |
| 8,136,791 | B2 * | 3/2012 | Denis | F17C 13/04 |
| | | | | 137/320 |
| 8,573,253 | B2 * | 11/2013 | Ogami | F17C 13/04 |
| | | | | 137/590 |
| 2004/0056112 | A1 * | 3/2004 | Faye | B01F 5/0413 |
| | | | | 239/424 |
| 2015/0184805 | A1 * | 7/2015 | Lee | F17C 13/04 |
| | | | | 137/544 |
| 2016/0104903 | A1 * | 4/2016 | Nakamura | F16K 1/34 |
| 2016/0369905 | A1 | 12/2016 | Nakamura | |
| 2017/0370385 | A1 * | 12/2017 | Reckner | F15D 1/025 |

* cited by examiner

VALVE UNIT

CROSS REFERENCE TO RELATED APPLICATIONS

The present application claims priority from Japanese patent application JP 2017-029381 filed on Feb. 20, 2017, the content of which is hereby incorporated by reference into this application.

BACKGROUND

Technical Field

The present disclosure relates to valve units.

Background Art

Fuel cell vehicles are provided with a valve unit to control the supply of hydrogen from an in-vehicle gas tank to a fuel cell and the stopping of such supply. JP 2016-80001 A describes one example of such a valve unit. This valve unit includes a gas flow channel connected to the gas tank. High-pressure hydrogen gas in the gas tank passes through an electromagnetic valve disposed in the gas flow channel, passes through a pressure-reducing valve and then is supplied to the fuel cell.

SUMMARY

An in-vehicle gas tank of a fuel cell vehicle is typically filled with high-pressure hydrogen gas from an external hydrogen refueling station. As in the valve unit described in JP 2016-80001 A, hydrogen gas contained in the gas tank flows through a gas flow channel in the valve unit and then is supplied to a fuel cell as a gas-consuming device. In a valve unit of this type, the gas flow channel connects a gas inlet from an outside, such as an hydrogen refueling station, with a communication port into the gas tank, and when this gas flow channel is a substantially straight channel without a bend, the gas can flow through the gas flow channel downward in a substantially straightened manner to be parallel to the gas flow channel. When the gas flow channel has a bend that bends at 90 degrees, for example, at some midpoint of the channel, the gas will generate disturbance in the flow when passing through the bend. The experiment by the present inventors showed that the flow may be swirling flow during passing through the bend.

Some valve units include a branching part located downstream of the bend, from which a branching gas flow channel extends toward the fuel cell as a gas-consuming device. In this case, during filling of the gas tank with gas, the gas may enter into the branching gas flow channel because of the swirling flow flowing downstream of the bend. If the gas contains a small amount of water, such water may adhere to an on-off valve on the side of the gas-consuming device. Such adhered water may cause instable operation of the valve at the initial stage, and so has to be avoided.

In view of the above circumstances, the present disclosure provides a valve unit at least including a gas inlet from an outside, a communication port to a gas tank, and a gas supplying port to a gas-consuming device. The gas flow channel connecting the gas inlet to the communication port to the gas tank has a bend, and has a branching gas flow channel toward the gas supplying port to the gas-consuming device, the branching gas flow channel being located downstream of the bend, and the valve unit is capable of effectively suppressing entrance of water contained in gas into the branching gas flow channel.

A valve unit according to a first embodiment of the present disclosure at least includes a gas inlet from outside, a communication port to a gas tank, and a gas supplying port to a gas-consuming device. The gas inlet includes a check valve, and each of the communication port to the gas tank and the gas supplying port includes an on-off valve, the gas inlet and the communication port to the gas tank are in communication through a first gas flow channel, a second gas flow channel branches off from the first gas flow channel via a branching part, and the second gas flow channel connects to the gas supplying port, the first gas flow channel has a bend, the branching part toward the second gas flow channel is located between the bend of the first gas flow channel and the communication port to the gas tank, the first gas flow channel at a part between the bend and the branching part internally includes a straightening member configured to straighten a flow of gas from the upstream to be parallel to a direction of the first gas flow channel.

During filling of the gas tank with gas, the gas flowing through the first gas flow channel turns a disturbed flow including swirling flow at the bend. According to the valve unit of the first embodiment, such a disturbed flow can be straightened when flowing through the straightening member so as to be parallel to the direction of the first gas flow channel, and so the swirling flow can be removed. Such a straightened state of the gas flow can be kept also during the passage of the branching part to the second gas flow channel. Therefore substantially no gas flow enters into the second gas flow channel. This can avoid the problem about the operation of the on-off valve at the gas supplying port even when the gas flow contains water.

The experiment of the present inventors shows that when a part of the first gas flow downstream of the bend is circle in cross section, the straightening member having a length that is 1.5 times or more a diameter of the part of the first gas flow channel can straighten the gas flow sufficiently.

In the valve unit of the first embodiment, the straightening member is not limited especially as long as it can straighten the gas flow from the upstream to be parallel to the direction of the first gas flow channel. The experiment by the present inventors shows that the straightening member that has an elongated hole that is parallel to a direction of the first gas flow channel at a part downstream of the bend or that includes at least one flat plate that is parallel to a direction of the first gas flow channel at a part downstream of the bend is preferable also from the viewpoint of manufacturability.

A valve unit according to a second embodiment of the present disclosure at least includes a gas inlet from outside, a communication port to a gas tank, and a gas supplying port to a gas-consuming device. The gas inlet includes a check valve, and each of the communication port to the gas tank and the gas supplying port includes an on-off valve, the gas inlet and the communication port to the gas tank are in communication through a first gas flow channel, a second gas flow channel branches off from the first gas flow channel via a branching part, and the second gas flow channel connects to the gas supplying port, the first gas flow channel has a bend, the branching part toward the second gas flow channel is located between the bend of the first gas flow channel and the communication port to the gas tank, the first gas flow channel internally includes a channel separator configured to divide the first gas flow channel at a part downstream of the bend into two parts, and one of the divided channels divided by the channel separator is in communication with the gas inlet, and the other channel is in communication with the second gas flow channel via the branching part, and the channel separator has a lower end located downstream of the branching part.

During filling of the gas tank with gas, the gas flowing through the first gas flow channel may turn a disturbed flow including swirling flow at the bend. According to the valve unit of the second embodiment, such a gas flow flows through one of the divided channels divided by the channel separator and then flows into the communication port of the gas tank. The channel separator has a lower end located downstream of the branching part, and so the gas flows does not flow into the second gas flow channel via the branching part during the passage through the one of the divided channels. This can avoid the entrance of water, which may be contained in the gas flow, into the second gas flow channel during filling of the gas tank with gas. This can avoid the problem about the operation of the on-off valve at the gas supplying port at the starting time of the operation, for example.

When an in-vehicle gas tank is filled with high-pressure hydrogen from an external hydrogen refueling station, for example, the valve unit according to the present disclosure can prevent entrance of water, which may be included in the gas, into the branching gas flow channel leading to the fuel cell as the gas-consuming device. This can avoid the problem about the operation of the gas-consuming device, which may occur due to the problem of the motion of the valve at the starting time of the operation.

DETAILED DESCRIPTION

The following describes embodiments of the present disclosure in details, with reference to the drawings. In this example, a valve unit 100 is an accessary of a gas tank 1 that is mounted on a fuel cell vehicle, and the valve unit has a body 2. The body 2 includes a check valve 10 as a gas inlet from an outside. For the check valve 10, a conventionally known one may be used. The check valve 10 has one end that is a filling inlet 11, to which a supply nozzle of a filling machine 6 installed at an external hydrogen refueling station 5 is connected, whereby high-pressure hydrogen gas stored in a gas storage 7 is introduced into the valve unit 100.

[First Embodiment]

Figure 1:
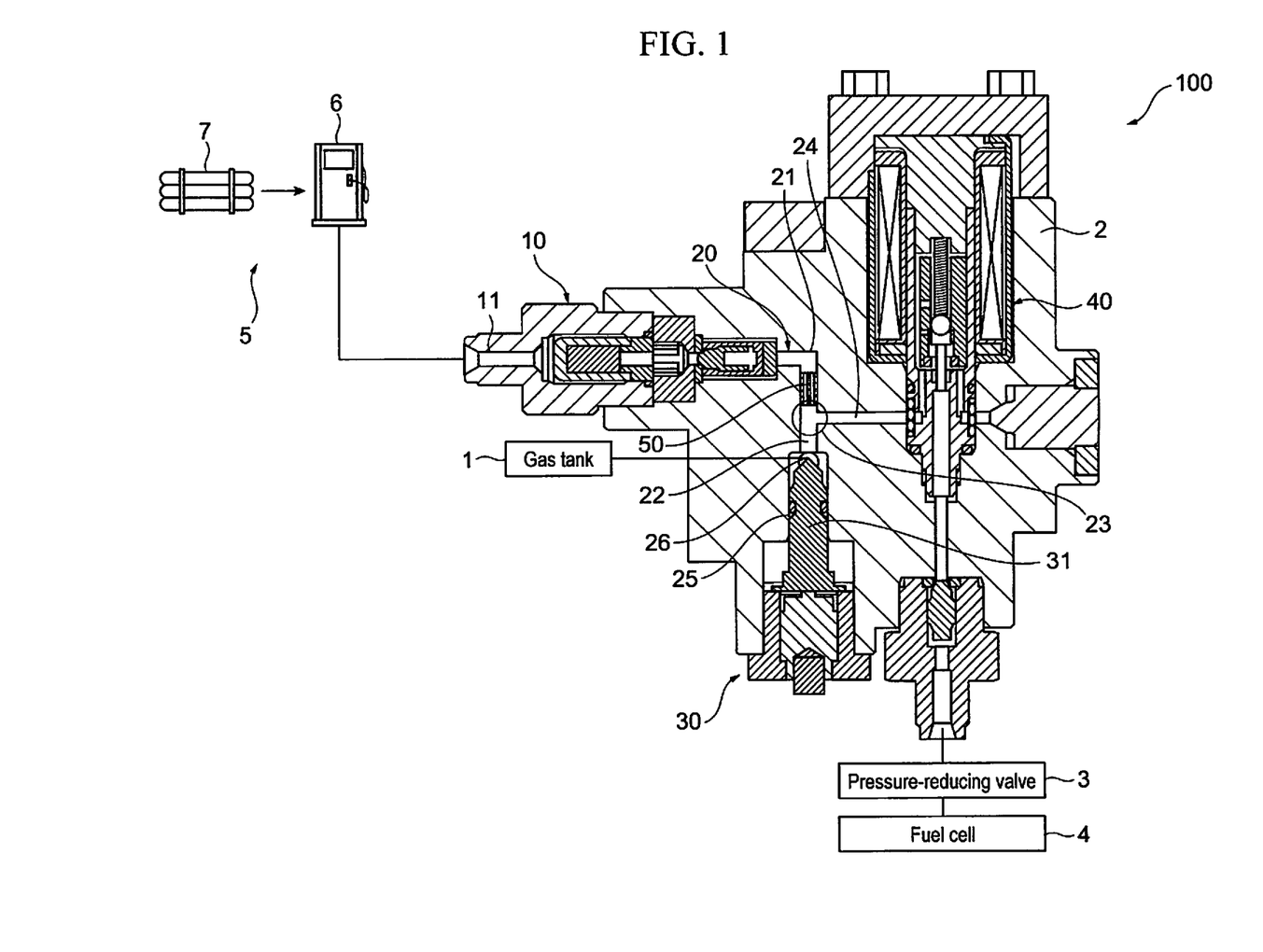
FIG. 1 is a cross-sectional view of one mode of a valve unit in a first embodiment according to the present disclosure.

The outlet of the check valve 10 is connected to a first gas flow channel 20 formed in the body 2. The first gas flow channel 20 is circular in cross section, and has a bend 21 at a part thereof. The bend is bent at 90 degrees. A part of the first gas flow channel 20 downstream of the bend 21 (hereinafter this part is called a "downstream part 22 of the first gas flow channel") is straight, and the downstream part has an end connected to a leading end of a cylindrical part 25. The cylindrical part is formed in the body 2 and has a diameter larger than that of the downstream part 22. This cylindrical part 25 has a communication port 26 with the gas tank 1, and the gas tank 1 is filled with high-pressure hydrogen gas via the communication port 26.

Into the cylindrical part 25, a movable valve portion 31 of an on-off valve 30 as an electromagnetic valve, for example, is inserted movably forward and backward. When the movable valve portion 31 moves forward, the communication port 26 is closed. When the movable valve portion 31 moves backward, the communication port 26 is opened. When the communication port 26 is open, the first gas flow channel 20 is in communication with the gas tank 1.

A branching part 23 is formed at a position between the bend 21 of the first gas flow channel 20 and the communication port 26 to the gas tank 1, i.e., at an appropriate position of the downstream part 22 of the first gas flow channel as described above. From this branching part 23, a second gas flow channel 24 branches off in the direction of 90 degrees relative to the direction of the center axis line of the downstream part 22 of the first gas flow channel. This second gas flow channel 24 has a downstream end connected to an on-off valve 40 as an electromagnetic valve, for example. When the on-off valve 40 is closed, the outgoing side of the second gas flow channel 24 is closed. When the on-off valve 40 is opened, the outgoing side of the second gas flow channel 24 connects to a pressure-reducing valve 3 and a fuel cell 4 mounted on the vehicle via the on-off valve 40. Thereby hydrogen as fuel is supplied to the fuel cell 4. This on-off valve 40 as the electromagnetic valve may be a conventionally known valve as described in JP 2016-80001 A as described above, for example, and the detailed descriptions on the on-off valve 40 are omitted.

At a part of the downstream part 22 of the first gas flow channel that is upstream of the branching part 23, i.e., at a part between the bend 21 and the branching part 23 of the first gas flow channel 20, a straightening member 50 is disposed inside of the gas flow channel. The straightening member 50 is shaped so that gas flow from the upstream can be straightened to be parallel to the direction of the center axis line of the downstream part 22 of the first gas flow channel. Let that D denotes the diameter of the cylindrical downstream part 22 of the first gas flow channel, the straightening member 50 has a length L in the direction of the axis line of L≥1.5 D preferably.

FIGS. 2A to 2D show some examples of the specific shape of the straightening member 50, which shows these straightening members disposed at a part between the bend 21 and the branching part 23 of the first gas flow channel 20. In FIGS. 2A to 2D, the upper drawings are plan views and the lower drawings are cross sectional views taken along the line s-s of the corresponding upper drawings.

Figure 2A:
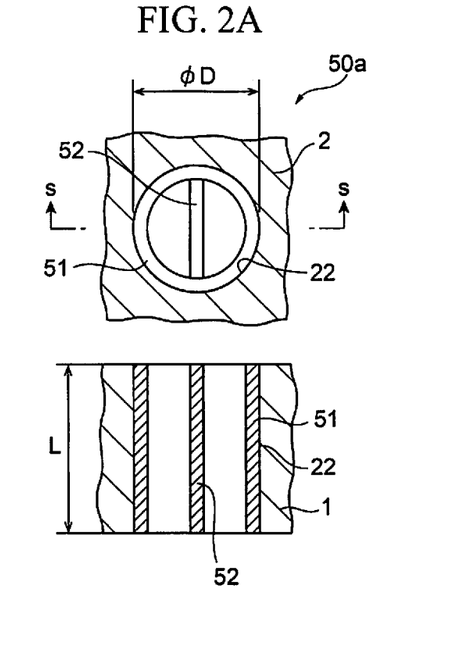
FIGS. 2A to 2D show specific examples of a straightening member.
Figure 2B:
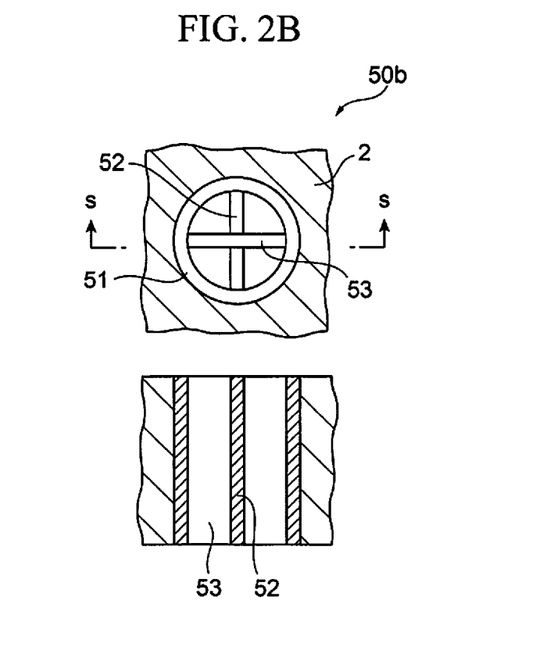

The straightening member 50a of FIG. 2A is made up of a cylindrical body 51 having an outer diameter D and a length L, and one perpendicular wall 52 having a length L that stands at the maximum-diameter part on the inner peripheral face of the cylindrical body 51 in the direction of the axis line of the cylindrical body 51. The internal space of the straightening member 50a is divided into two in the axial direction by the perpendicular wall 52. The straightening member 50b of FIG. 2B includes another perpendicular wall 53 that is orthogonal to and integral with the perpendicular wall 52 of the straightening member 50a of FIG. 2A. In this case, the internal space of the straightening member 50b is divided into four in the axial direction by the perpendicular walls 52 and 53.

Figure 2C:
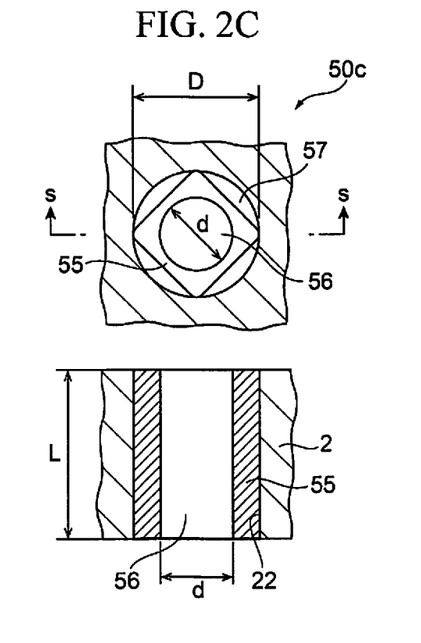

The straightening member 50c of FIG. 2C includes a cuboid 55 having a diagonal line of D in length and having a length L, and one cylindrical communicating hole 56 having a diameter d bored at a center part of the cuboid. As shown in the upper drawing of FIG. 2C, this straightening member 50c is disposed at a part between the bend 21 and the branching part 23 of the first gas flow channel 20. Thereby, the internal space of the downstream part 22 of the first gas flow channel is divided into five spaces, including four spaces 57 that are defined with the inner peripheral face of the first gas flow channel and four outer peripheral walls of the cuboid 55 and one space inside of the cylindrical communicating hole 56. All of these five spaces are parallel to the axially center line of the downstream part 22 of the first gas flow channel.

Figure 2D:
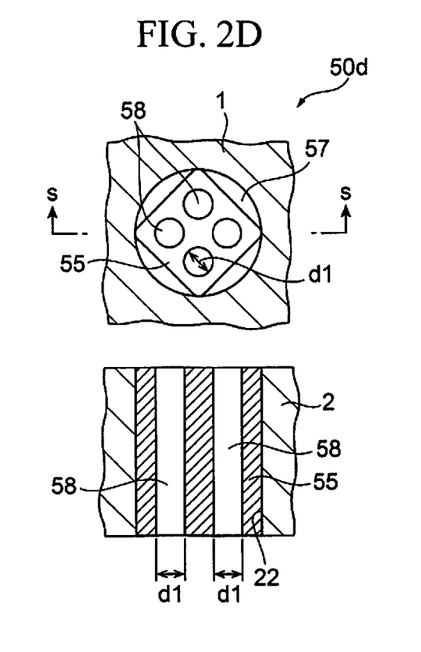

The straightening member 50d of FIG. 2D includes a cuboid 55 that is the same as that in the straightening member 50c of FIG. 2C, and through holes bored in the cuboid 55 have a different shape from the above. The through holes 58 of the straightening member 50d are bored in the cuboid 55 and each of the through holes has a cylindrical shape having diameter d1 (<d). The appropriate number of these through holes (four in the drawing) is equally distributed in the circumferential direction. This straightening member 50d is disposed at a part between the bend 21 and the branching part 23 of the first gas flow channel 20. With this configuration, the internal space of the downstream part 22 of the first gas flow channel is divided into eight spaces in total, including four spaces 57 that are defined with the inner peripheral face of the first gas flow channel and four outer peripheral walls of the cuboid 55, and four spaces inside the four cylindrical communicating holes 58. In this case also, all of these eight spaces are parallel to the axially center line of the downstream part 22 of the first gas flow channel.

Figure 3A:
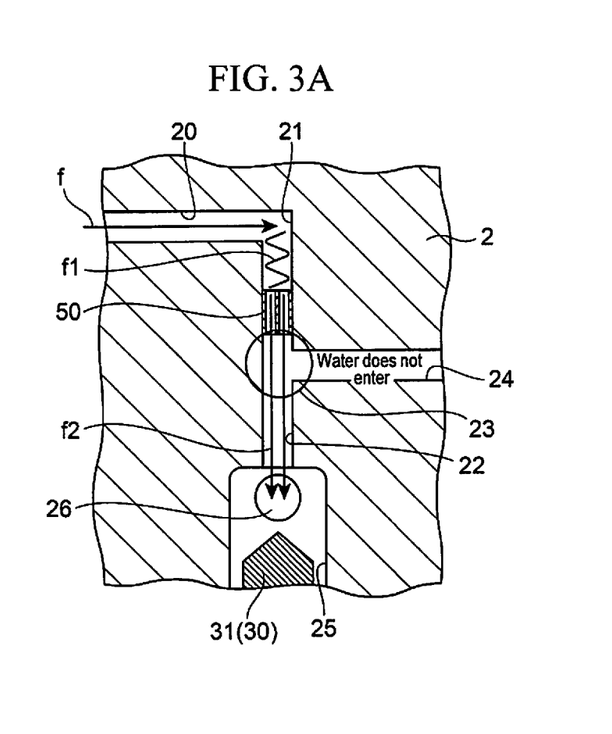
FIG. 3A schematically shows the gas flow in the valve unit in the first embodiment.
Figure 3B:
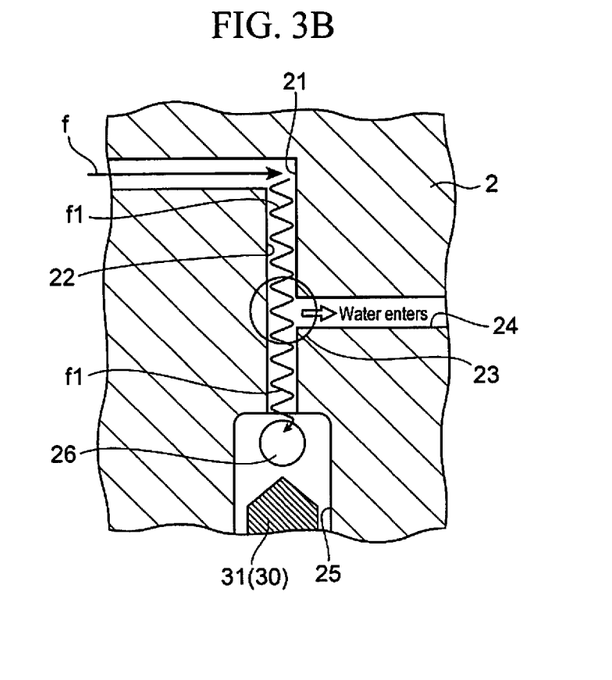
FIG. 3B schematically shows the gas flow in the same valve unit without a straightening member.

Referring to FIGS. 3A and 3B, the following describes the operation of the valve unit 100. FIGS. 3A and 3B are schematic enlarged views of the valve unit 100, showing the first gas flow channel 20, the downstream part 22 of the first gas flow channel that is a part downstream of the bend 21 of the first gas flow channel 20, and a part of the second gas flow channel 24 that branches off from the branching part 23 at the downstream part 22 of the first gas flow channel in the 90-degree direction. FIG. 3A shows the gas flow in the valve unit 100 including the straightening member 50 of the present embodiment, and FIG. 3B shows the gas flow of the same valve unit without the straightening member 50.

When the in-vehicle gas tank 1 is filled with high-pressure hydrogen gas from the external hydrogen refueling station 5, the on-off valve 30 at the end of the downstream part 22 of the first gas flow channel is opened and the on-off valve 40 of the second gas flow channel 24 is closed. When the filling machine 6 is manipulated, high-pressure hydrogen gas from the hydrogen refueling station 5 flows into the first gas flow channel 20 via the check valve 10 and is supplied into the gas tank 1 via the communication port 26 to the gas tank 1. During filling of the gas tank 1 with the gas, the interior of the gas tank 1 is at low pressure, and the gas flow f flows through the first gas flow channel 20 at a high speed. This gas flow f is a parallel flow along the axially center line of the first gas flow channel 20.

The gas flow f in the first gas flow channel 20 reaches the bend 21 of the first gas flow channel 20 and turns in the 90-degree direction there. As shown in FIG. 3B, due to such turning in the direction, the gas flow f at a high speed turns vortex flow f1. Then such vortex flow f1 passes through the downstream part 22 of the first gas flow channel, and reaches the communication port 26 of the gas tank 1. If the gas flow f contains water, as shown in FIG. 3B, water in the gas may enter into the second gas flow channel 24 because of the centrifugal force of the swirling when the vortex flow f1 passes through the branching part 23 toward the second gas flow channel 24.

When the filling of the gas tank 1 with a predetermined amount of gas ends, the on-off valve 30 is closed and the supply nozzle of the filling machine 6 is detached from the vehicle. When driving the in-vehicle fuel cell 4, the on-off valve 30 is opened so that the gas tank 1 and the first gas flow channel 20 are in communication via the communication port 26. Then, high-pressure hydrogen gas in the gas tank 1 reaches the on-off valve 40 through the second gas flow channel 24. When the on-off valve 40 is opened, the hydrogen gas is supplied to the fuel cell 4 as the gas-consuming device while having the pressure controlled by the pressure-reducing valve 3.

During such supplying of hydrogen gas into the fuel cell, if water enters into the second gas flow channel 24 as stated above, water as well as the gas flow flows into the on-off valve 40. In such a case, a problem may occur in the operation of the on-off valve 40. When the valve unit 100 is in a low-temperature environment, such water in the second gas flow channel 24 may be frozen. Then such water in the second gas flow channel 24 exercises severe influences on the on-off valve 40.

As shown in FIG. 3A, the valve unit 100 of the present embodiment as stated above includes the straightening member 50 (e.g., in any one of the modes 50a to 50d of FIGS. 2A to 2D) disposed at a part upstream of the branching part 23 of the downstream part 22 in the first gas flow channel, that is, in a region between the bend 21 and the branching part 23 in the first gas flow channel 20. With this configuration, even when the gas flow f is vortex flow f1 at a part upstream of the straightening member 50, such vortex flow f1 can be straightened to be parallel to the axially center line of the through hole(s) 56, 58 or the spaces 57 defined with the straightening member 50 during the passage through the straightening member 50. As a result, gas flow f2 after passing through the straightening member 50 is parallel to the direction of the center axis line of the downstream part 22 of the first gas flow channel. Therefore when the gas flow f2 passes through the branching part 23 of the second gas flow channel 24, deflected flow does not occur toward the second gas flow channel 24. This can reliably avoid the entrance of water, which may be contained in the gas flow f, into the second gas flow channel 24.

The above describes the example where gas flowing through the first gas flow channel 20 of the valve unit 100 is hydrogen gas and the device to consume hydrogen gas is the in-vehicle fuel cell 4. The uses of the valve unit 100 are not limited to this example. Any valve unit for any use, which includes the bend 21 in the first gas flow channel 20 and the branching part 23 toward the second gas flow channel 24 located between the bend 21 of the first gas flow channel 20 and the communication port 26 toward an appropriate gas tank, may include a "straightening member" as stated above, whereby a desired configuration of the present disclosure can be realized. Gas flowing through the first gas flow channel 20 also is not limited to hydrogen gas.

The above describes the bend 21 that is bent at 90 degrees for illustrative purpose, and the angle of bending may be any angle.

The above describes the example where the first gas flow channel 20 downstream of the bend 21 is circular in cross section and has diameter D, and the straightening member 50 has length L in the direction of the axially center line, and L≥1.5 D holds preferably. According to the experiment by the present inventors, when the conditions of L≥1.5 D is satisfied, vortex flow f1 can be highly likely straightened to be straightening flow C. In the case of L<1.5 D, a vortex component was still left after the passage of the straightening member 50 in some conditions of the vortex flow f1. Even when the gas flow f has originally the same condition for the motion, the swirling force of the vortex flow f1 varies with the diameters of the first gas flow channel 20 and the downstream part 22 of the first gas flow channel and with the angle of bending of the bend 21. Therefore any optimum condition satisfying L≥1.5 D is selected from experiment preferably.

[Second Embodiment]

The following describes a second embodiment of the valve unit. The valve unit of the second embodiment is different from the valve unit 100 of the first embodiment only in that it includes a "channel separator" described below instead of the "straightening member 50 (50a to 50d)" in the valve unit 100 of the first embodiment. The use of the valve unit and the type of gas flowing through the valve unit are the same as in the valve unit 100 of the first embodiment. The following mainly describes the structure relating to the "channel separator", and the description and the drawing on the other structure are omitted.

Figure 4A:
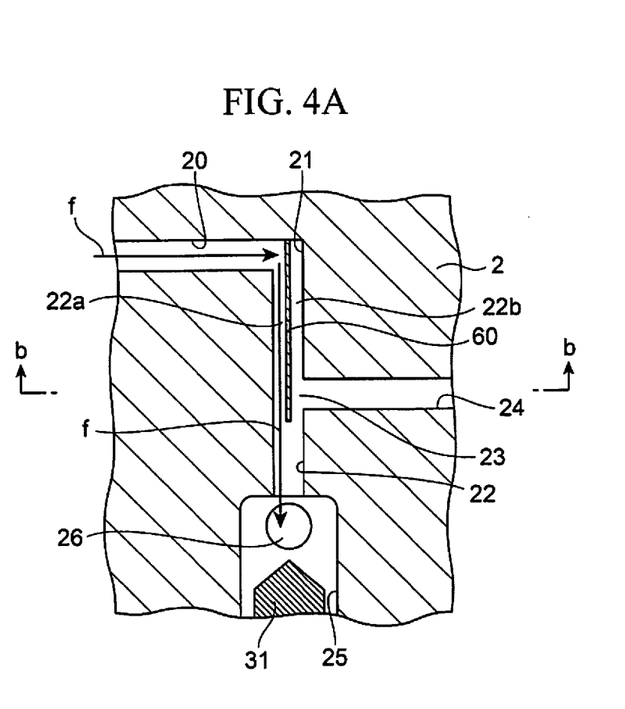
FIGS. 4A and 4B are cross-sectional views of one mode of a valve unit in a second embodiment according to the present disclosure.
Figure 4B:
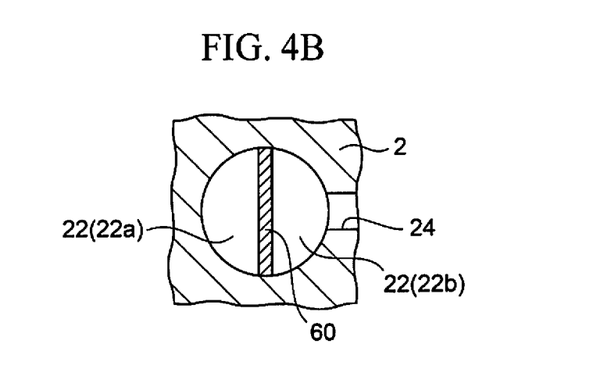

FIGS. 4A and 4B show the valve unit of the second embodiment, which corresponds to FIG. 3A, and FIG. 4B is a cross-sectional view taken along the line b-b of FIG. 4A. Like numerals indicate like parts as in FIGS. 3A and 3B.

In this embodiment, a flat-plate like channel separator 60 is disposed at a part downstream of the bend 21 in the first gas flow channel 20 (the downstream part 22 of the first gas flow channel) and at a position of dividing the channel into two in the gas-flow direction, i.e., along the axis line of the downstream part 22 of the first gas flow channel 20. In the illustrated example, as shown in FIG. 4B, the channel separator 60 has a width equal to the diameter of the downstream part 22 of the first gas flow channel 20. As shown in FIG. 4A, the channel separator has an upper end that is in contact with the upper face of the first gas flow channel 20 at the bend 21, and a lower end located downstream of the branching part 23.

With this configuration, the downstream part 22 of the first gas flow channel 20 is divided into two parts in the direction of the axis line at a part where the channel separator 60 is disposed, and the two divided channels joint together at a position downstream of the lower end of the channel separator 60. One of the divided channels 22a is in communication with the first gas flow channel 20 at a part upstream of the bend 21, and so connects to the gas inlet. The other of the divided channels 22b is in communication with the second gas flow channel 24 via the branching part 23 located at a part of the first gas flow channel where the channel separator 60 is disposed.

The following describes the operation of this valve unit. Similarly to the valve unit 100 of the first embodiment, the in-vehicle gas tank 1 is filled with high-pressure hydrogen gas from the external hydrogen refueling station 5. Gas flows into the first gas flow channel 20 via the check valve 10 shown in FIG. 1, and such gas flow f flows through the first gas flow channel 20 at a high speed.

The gas flow f in the first gas flow channel 20 reaches the bend 21 of the first gas flow channel 20, and collides with the channel separator 60 located at the bend 21 and turns to flow downward. The gas flow is disturbed because of the collision, and the gas flow in such a state flows downward through one of the divided channels 22a. Then the gas flow reaches the communication port 26 to the gas tank 1. The lower end of the channel separator 60 is located downstream of the branching part 23. This can prevent the gas flow that flows downward through the one channel 22a, which may be disturbed or straightened, from flowing into the second gas flow channel 24 via the branching part 23. This can reliably avoid the entrance of water, which may be contained in the gas flow f, into the second gas flow channel 24.

Figure 5:
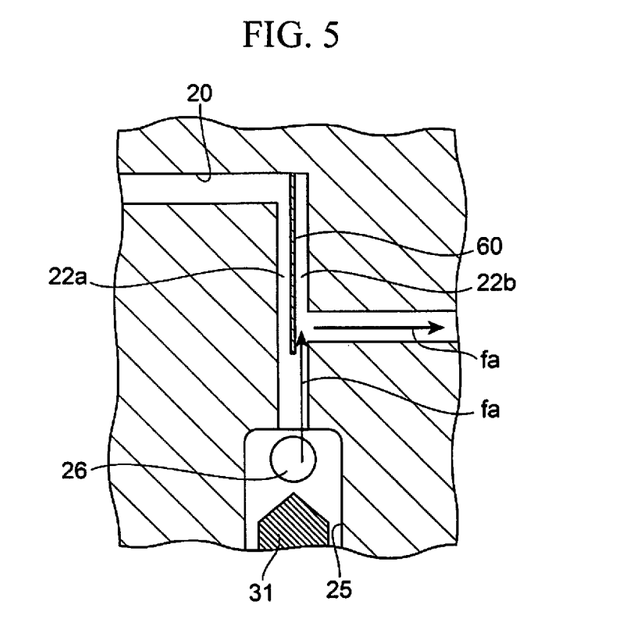
FIG. 5 shows the gas flow in the valve unit of FIG. 4 when gas is supplied from the gas tank to the gas-consuming device.

Similarly to the valve unit 100 of the first embodiment, when hydrogen gas is supplied as the fuel from the gas tank to the fuel cell 4, the gas flows like gas-flow fa in FIG. 5. That is, high-pressure gas from the gas tank firstly flows into the two divided channels 22a and 22b divided by the channel separator 60. One of the channels 22a, however, is blocked by the check valve, and so the gas does not flow to the outside from the channel 22a. On the contrary, the upper end of the other channel 22b is closed because the upper end of the channel separator 60 is in contact with the upper face of the first gas flow channel 20 at the bend 21, and so gas flowing into the other channel 22b flows into the second gas flow channel 24 via the branching part 23 to be sent to the fuel cell 4.

As stated above, the valve unit of the second embodiment can prevent the gas from flowing downward while directly coming into contact the opening as the branching part 23 during filling of the gas tank. In this way, similarly to the valve unit 100 of the first embodiment, this valve unit can prevent the gas from flowing into the second gas flow channel 24 during filling of the gas tank.

Figure 6:
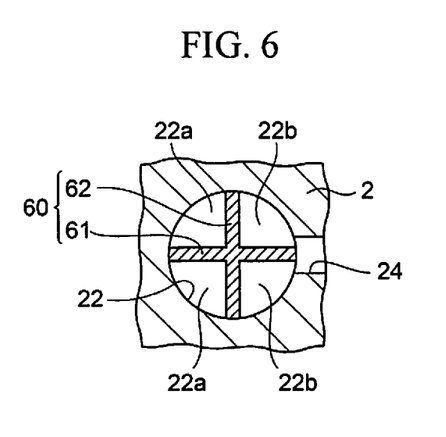
FIG. 6 is a cross-sectional view of a shielding body in another mode of the valve unit of the second embodiment.

FIGS. 4A, 4B and 5 show one flat plate as the channel separator 60. Alternatively as shown in FIG. 6, the channel separator 60 may be the crosswise combination of two flat plates 61 and 62.

Figure 7A:
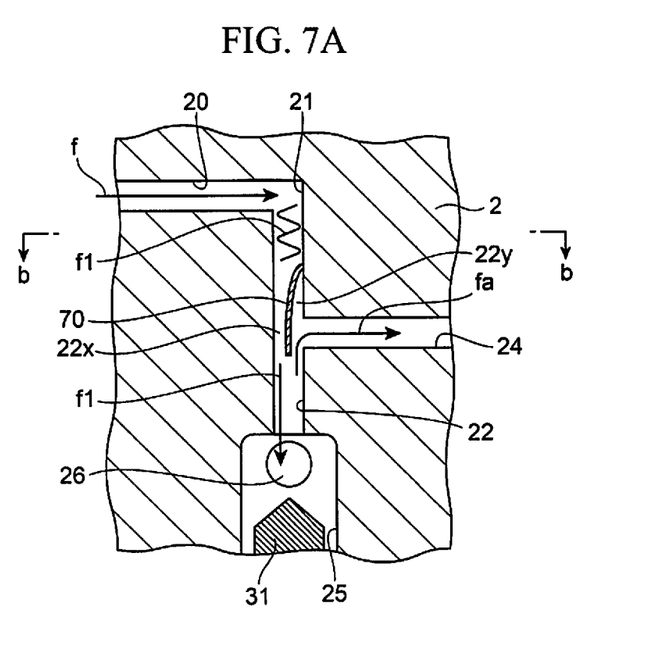
FIGS. 7A and 7B show another mode of the valve unit in the second embodiment.
Figure 7B:
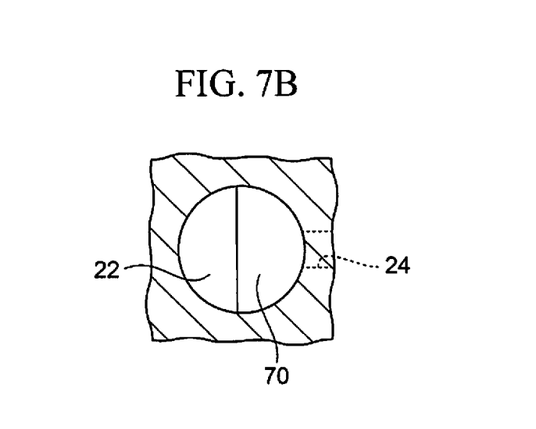

FIGS. 7A and 7B show another mode of the valve unit of the second embodiment, which corresponds to FIGS. 4A and 4B. FIG. 7B is a cross-sectional view taken along the line b-b of FIG. 7A. A channel separator 70 in this embodiment is different from that in FIGS. 4A and 4B in that the channel separator divides the downstream part 22 of the first gas flow channel 20 into two channels only in the vicinity of the branching part 23.

In the embodiment of FIGS. 7A and 7B, the channel separator 70 is semi-elliptical, and an outer peripheral edge part as a curved portion of the semi-ellipse is disposed above the branching part 23 and is fixed to the inner peripheral face of the downstream part 22 of the first gas flow channel 20 so that the channel separator like a tilted plate is integrated with the downstream part 22 of the first gas flow channel 20. The lower end part of the channel separator 70 is straight, and reaches a part below the branching part 23.

As shown in FIGS. 7A and 7B, such a channel separator 70 like a tilted plate divides a part of the downstream part 22 of the first gas flow channel 20 into a first channel 22x on the left and a second channel 22y on the right that is on the opposite side across the channel separator 70. The first channel 22x as one of the divided channels is in communication with the upstream first gas flow channel 20, and so connects to the gas inlet. The second channel 22y as the other divided channel is in communication with the second gas flow channel 24 via the branching part 23 located at a part of the first gas flow channel where the channel separator 70 is disposed.

The advantageous effects from this channel separator 70 are substantially the same as those from the channel separator 60 of FIGS. 4A, 4B and 5, and their description is omitted.

DESCRIPTION OF SYMBOLS

100 Valve unit
1 Gas tank
2 Body
3 Pressure-reducing valve
4 Fuel cell
5 External hydrogen refueling station
6 Filling machine
7 Gas storage
10 Check valve
11 Filling inlet of check valve
20 First gas flow channel
21 Bend
22 Downstream part of first gas flow channel
23 Branching part
24 Second gas flow channel
25 Cylindrical part
26 Communication port to gas tank
30 On-off valve as electromagnetic valve
31 Movable valve portion as electromagnetic valve
40 On-off valve as electromagnetic valve
50 (50a to 50d) Straightening member
51 Cylindrical part
52, 53 Perpendicular wall
55 Cuboid
56, 58 Cylindrical communicating hole bored at a center of cuboid
57 Space defined with straightening member
60, 70 Channel separator
D Diameter of downstream part 22 of first gas flow channel 20 in which straightening member is disposed
L Length of straightening member

What is claimed is:

1. A valve unit at least comprising a gas inlet from outside, a communication port to a gas tank, and a gas supplying port to a gas-consuming device, wherein
the gas inlet includes a check valve, and each of the communication port to the gas tank and the gas supplying port includes an on-off valve,
the gas inlet and the communication port to the gas tank are in communication through a first gas flow channel, a second gas flow channel branches off from the first gas flow channel at a branching part, and the second gas flow channel connects to the gas supplying port,
the first gas flow channel has a bend,
the branching part is located between the bend of the first gas flow channel and the communication port to the gas tank, the first gas flow channel at a part between the bend and the branching part internally includes a straightening member configured to straighten a flow of gas from upstream to be parallel to a direction of the first gas flow channel downstream of the bend.

2. The valve unit according to claim 1, wherein the first gas flow channel at a part downstream of the bend is circular in cross section, and the straightening member has a length that is 1.5 times or more a diameter of the first gas flow channel at the part downstream of the bend.

3. The valve unit according to claim 1, wherein the straightening member has an elongated hole that is parallel to a direction of the first gas flow channel at a part downstream of the bend.

4. The valve unit according to claim 1, wherein the straightening member includes at least one flat plate that is parallel to a direction of the first gas flow channel at a part downstream of the bend.

5. A valve unit at least comprising a gas inlet from outside, a communication port to a gas tank, and a gas supplying port to a gas-consuming device, wherein
the gas inlet includes a check valve, and each of the communication port to the gas tank and the gas supplying port includes an on-off valve,
the gas inlet and the communication port to the gas tank are in communication through a first gas flow channel, a second gas flow channel branches off from the first gas flow channel via a branching part, and the second gas flow channel connects to the gas supplying port,
the first gas flow channel has a bend, the branching part toward the second gas flow channel is located between the bend of the first gas flow channel and the communication port to the gas tank, the first gas flow channel internally includes a channel separator configured to divide the first gas flow channel at a part downstream of the bend into two parts, and
one of the two parts of the first gas flow channel divided by the channel separator is in communication with the gas inlet, and the other of the two parts of the first gas flow channel is in communication with the second gas flow channel via the branching part, and the channel separator has a lower end located downstream of the branching part; such that gas flowing from the gas inlet flows past the lower end of the channel separator before entering the second gas flow channel and water is substantially prevented from flowing from the gas inlet into the second gas flow channel.

6. A method of using a flow straightener in a valve unit, the method comprising the steps of:
providing a valve unit comprising:
a gas inlet from outside, a communication port to a gas tank, and a gas supplying port to a gas-consuming device, wherein the gas inlet and the communication port to the gas tank are in communication through a first gas flow channel, a second gas flow channel branches off from the first gas flow channel at a branching part, and the second gas flow channel connects to the gas supplying port,
wherein the first gas flow channel has a bend, and
wherein the branching part is located between the bend of the first gas flow channel and the communication port to the gas tank; and
straightening the flow of gas with a flow straightener downstream of the bend and upstream of the branching part to reduce water condensation entering the second gas flow channel.

* * * * *